US012585740B2

(12) United States Patent
Yang et al.

(10) Patent No.: US 12,585,740 B2
(45) Date of Patent: Mar. 24, 2026

(54) ON-CHAIN PUSH-MODE MULTI-FACTOR AUTHENTICATION METHOD AND SYSTEM FOR BLOCKCHAIN SERVICES

(71) Applicant: Telefónica Innovacion Digital S.L., Madrid (ES)

(72) Inventors: Xiaoyuan Yang, Madrid (ES); Lucia Muñoz Martines, Madrid (ES); David De la Calle Galindo, Madrid (ES); Javier Espinosa Garcia, Madrid (ES); Luis Angel Garcia Muñoz, Madrid (ES); Yaiza Rubio Viñuela, Madrid (ES); Saray Arranz Cancho, Madrid (ES)

(73) Assignee: Telefónica Innovacion Digital S.L., Madrid (ES)

( * ) Notice: Subject to any disclaimer, the term of this patent is extended or adjusted under 35 U.S.C. 154(b) by 232 days.

(21) Appl. No.: 18/441,595

(22) Filed: Feb. 14, 2024

(65) Prior Publication Data

US 2024/0273170 A1 Aug. 15, 2024

(30) Foreign Application Priority Data

Feb. 15, 2023 (EP) ..................................... 23382139

(51) Int. Cl.
*G06F 21/31* (2013.01)
(52) U.S. Cl.
CPC ..................................... *G06F 21/31* (2013.01)
(58) Field of Classification Search
None
See application file for complete search history.

(56) References Cited

U.S. PATENT DOCUMENTS 11,025,431 B2 6/2021 Sharma et al.
11,257,078 B2 2/2022 Mittal et al.
(Continued)

OTHER PUBLICATIONS

Oktian YE, Lee SG, Lee HJ. Twochain: Leveraging blockchain and smart contract for two factor authentication. In2020 3rd International Seminar on Research of Information Technology and Intelligent Systems (ISRITI) Dec. 1, 20200 (pp. 187-191). IEEE. (Year: 2020).*

(Continued)

*Primary Examiner* — James R Turchen
(74) *Attorney, Agent, or Firm* — Sughrue Mion, PLLC

(57) ABSTRACT

A method and a system for multi-factor authentication for blockchain services are proposed. The method comprises holding, by a server, an account of an end-user, the account being identifiable via an accountID; associating the accountID with a clientAddr by executing a pairing process; establishing, by the end-user, using a software application, an approval status for a multi-factor service in the server; in response to said established approval status, calling, by the server, a changeStatus function of a multi-factor provider smart contract operating in at least one blockchain, the changeStatus function including the established multi-factor approval status, the clientAddr, and a certificate termed ownerAddr; modifying, by the provider, the established approval status in the blockchain; delivering, by the provider, a notification to the end-user via the server when the established approval status is modified in the blockchain; and retrieving, by a smart contract developer the established approval status from the provider.

10 Claims, 6 Drawing Sheets

(56)         References Cited

U.S. PATENT DOCUMENTS

| | | | | |
|---|---|---|---|---|
| 11,582,234 | B2 * | 2/2023 | Park | H04L 9/50 |
| 12,387,201 | B2 * | 8/2025 | Kulkarni | G06Q 20/34 |
| 2016/0261411 | A1 * | 9/2016 | Yau | G06Q 20/38215 |
| 2018/0262493 | A1 | 9/2018 | Andrade | |
| 2021/0084024 | A1 | 3/2021 | Sadayoshi et al. | |
| 2024/0112177 | A1 * | 4/2024 | Maier | G06Q 40/00 |

OTHER PUBLICATIONS

Abubakar M, Jaroucheh Z, Al Dubai A, Liu X. A lightweight and user-centric two-factor authentication mechanism for iot based on blockchain and smart contract. In2022 2nd International Conference of Smart Systems and Emerging Technologies (SMARTTECH) May 9, 2022 (pp. 91-96). IEEE. (Year: 2022).*

Homoliak I, Breitenbacher D, Binder A, Szalachowski P. SmartOTPs: An Air-Gapped 2-Factor Authentication for Smart-Contract Wallets. arXiv 2018. arXiv preprint arXiv:1812.03598. (Year: 2018).*

Kalash, Ghosh BC, Addya SK. Enhancing Security in Smart Contract Wallets: An OTP Based 2-Factor Authentication Approach. InProceedings of the 26th International Conference on Distributed Computing and Networking Jan. 4, 2025 (pp. 211-220). (Year: 2025).*

Javier Jose et al., "Secure enrollment token delivery for Zero Trust networks using blockchain", The 23rd Asia-Pacific Network Operations and Management Symposium (APNOMS), Sep. 28, 2022, pp. 1-6.

European Search Report of No. 23382139.6 dated Aug. 1, 2023.

* cited by examiner

ON-CHAIN PUSH-MODE MULTI-FACTOR AUTHENTICATION METHOD AND SYSTEM FOR BLOCKCHAIN SERVICES

TECHNICAL FIELD

The present invention generally relates to blockchain and authentication techniques. More particularly, the present invention relates to a method and to a system for on-chain push-mode authentication of end-users in blockchain services through more than one authentication factor.

BACKGROUND OF THE INVENTION

Web3 is the new distributed technology that changes how Internet will work in next decades. Blockchain is the core element of any web3 infrastructure. It provides a decentralized immutable database for smart contracts where different applications can be created, such as crypto coins, NFT or DAO. Multiple nodes run smart contracts in fully decentralized way and reaches a consensus about a new state for the blockchain.

Consensus in smart contract requires multiple conditions. First, all nodes share a common language about how a smart contract should be created and understood. Second, all input information that the smart contract needs to compute the new state should be available and common in all nodes during the execution. This second requirement implies that any input information could not be acquired from any dynamic sources. For instance, a smart contract cannot read an input data from a temperature sensor, because temperature may change from one read to another. General speaking, smart contracts cannot interact with any external APIs to retrieve real world data. To solve this problem, oracles systems (such as Chainlink) are created. In order to use oracle, the logic of a smart contract has to be split in different steps. First, the smart contract requests a data from the real world to an oracle. The oracle computes the data and write it into the blockchain creating a new state. The smart contract can then read the data and performs the consensus process.

Since smart contracts need to be executed multiple nodes for consensus, all data in blockchain should be publicly accessible. The identify of user in web3 is represented by a public key. All objects/data related with a user are associated to the public key without revering the real user. For instance, name of user or any other personal data should never be stored in the blockchain because they will be publicly accessible to anyone.

A public key is always associated with a private key. Any operation that requires authorization from the user needs to interact with a specialized software (called Wallet) that performs a cryptographic signature process that can only success if appropriate private key is provided. The private key cannot be recovered in any form if it is lost. A collateral consequence of this is the fact that the public key cannot be invalidated if the private key is lost.

Key invalidation and key recovery are very common processes in the web2. If one loses a password (key), (s)he just needs to start the password recovery process that normally means introducing a new password in a magic link that her/him got in an email. Same process can be used to invalidate a password or key.

In order to increase key based security, two-factor authentication (2FA) is well adopted in web2 services. 2FA is a security layer that make sure that users trying to access an online service are who they say they are. Instead of granting immediately access to the data after checking the key, users will be asked to provide another information that only the real user knows (PIN, password or answer to a secret question), has (a credit card, a smart-phone or a hardware token) or is (fingerprint, iris or voice print).

Current 2FA mechanisms can't be adopted by Web3 because any secret information should be publicly available in the blockchain. If we want to check if a user really knows the answer to a secret question in the smart contract, the answer should be in the blockchain so the smart contract can read it.

2FA provider could be implemented in different ways in web2. For instance, user may need to install an application in phone that ask user for approval whenever a 2FA is requested. The most popular way, however, is the utilization of SMS. In such a case, the 2FA service sends a SMS with a PIN number to the user's phone and ask user to introduce PIN back to a web portal. Since only user with access to the phone will receive the SMS, it provides an extra guarantee about the real identify of the user.

Depending how the 2FA is provided by the end-user, 2FA services could be divided in two categories:

Pull-Mode category: In this case, service needs to request end-users for 2FA every time it is required. For instance, end-users need to send a number received from SMS or interact with an application in the phone to authorize a specific interaction with the service.

Push-Mode category: In this case, 2FA is represented as a binary status (on or off) in the 2FA provider server. By interacting with the 2FA provider server, end-users are able to change the binary status. Each time a service wants to request 2FA from end-user, it interacts with the 2FA provider server to request the binary status. If the status is on, the service request will proceed. Otherwise, the request will be canceled. EP 2819371-B1, which incorporates blockchain as part of an authentication workflow, provides an implementation of such push-mode 2FA service.

In U.S. Ser. No. 11/257,078B2, the blockchain is used as 2FA for bank transactions. In this case, the system tries to solve the fact that 2FA based on mobile phones may fails when end-user is out of coverage of the cellular network. By requiring end-users to store one-time password in the blockchain, banking authorities can use public blockchain as 2FA, instead of the mobile phone.

In both previous patents, blockchain technology is used to implement 2F2 in different web2 applications.

On the other hand, U.S. Ser. No. 11/025,431B2 proposes to use a second wallet in a sidechain to perform 2FA. Before performing the transaction in the main chain, end-user need to post a token in the sidechain using the second wallet. The main chain is configured to check the existence of the token before proceeding the operation. The usage of sidechain provides a full distributed web3 solution. Second wallet is publicly trackable by looking the origin address of the token in the sidechain. U.S. Ser. No. 11/025,431B2 uses another wallet to provide 2FA, and not off-chain data for 2FA, as present invention does. In present invention the data that is used for 2FA comes from outside of blockchain. The separation of first authentication key (wallet) and second factor improves security because the information goes in separated channels. For instance, if a hacker manages to access the wallet management software (such as Metamask), it can potentially steal the two wallets used for authentication in U.S. Ser. No. 11/025,431B2. With present invention, hacker need both to steal the wallet as well as an off-chain data/device, such as the smartphone.

DESCRIPTION OF THE INVENTION

Present invention proposes, according to a first aspect, a method for multi-factor authentication for blockchain services. The method comprises: holding, by a push-mode multi-factor authentication server, an account of an end-user, the account being identifiable via an accountID; associating the accountID with an end-user's wallet address termed clientAddr by means of executing a pairing process; establishing, by the end-user, using a software application installed on a computing device such as a smart phone, among others, a multi-factor approval status for a multi-factor service in the push-mode multi-factor authentication server; in response to said established multi-factor approval status, calling, by the push-mode multi-factor authentication server, a changeStatus function of a multi-factor provider smart contract implemented or operating in at least one blockchain, the changeStatus function including the established multi-factor approval status, the clientAddr, and a certificate signed by the owner of the multi-factor provider smart contract, termed ownerAddr; modifying, by the multi-factor provider smart contract, the established multi-factor approval status in the at least one blockchain; delivering, by the multi-factor provider smart contract, a notification to the end-user via the push-mode multi-factor authentication server when the established multi-factor approval status is modified in the at least one blockchain; and retrieving, by a developer of a smart contract of the end-user, the established multi-factor approval status from the multi-factor provider smart contract by means of providing a smart contract address termed cSCAddr and a blockchain identification termed blockchainID to the push-mode multi-factor authentication server.

Present invention also proposes, according to another aspect, a system for multi-factor authentication for blockchain services, the system comprises at least one blockchain; a multi-factor provider smart contract implemented or operating in the at least one blockchain; a wallet application; a distributed web application; and a push-mode multi-factor authentication server configured to hold an account of an end-user, the account being identifiable via an accountID, and to store a multi-factor approval status for a multi-factor service established by the end-user. The proposed system is configured to implement the method of the first aspect of the invention.

In some embodiments, the multi-factor provider smart contract is implemented or operates in several blockchains; therefore, the push-mode multi-factor authentication server comprises calling the multi-factor provider smart contract in all of said several blockchains.

In some embodiments, the pairing process comprises requesting, by the end-user, a pairingToken to pair the multi-factor service; providing the clientAddr and the pairingToken to a distributed web application; providing, by the distributed web application, a signature request to a wallet application; generating, by the wallet application, a signature associated with the pairingToken and the clientAddr as a result of the end-user having approved the signature, the signature being generated by a private key associated with the clientAddr; sending, by the distributed web application, the pairingToken, the clientAddr, and the generated signature to the push-mode multi-factor authentication server; creating, by the push-mode multi-factor authentication server, a pairing structure that pairs the accountID and the clientAddr after the push-mode multi-factor authentication server having checked the legitimacy of the generated signature and validity of the pairingToken; providing, by the push-mode multi-factor authentication server, for each blockchain, the pairing structure together with the ownerAddr to the multi-factor provider smart contract; authorizing, by the multi-factor provider smart contract, a call to a pair function that creates the data structure to associate the accountID with the clienAddr by means of using a signature generated by a private key associated with the ownerAddr; providing, by the multi-factor provider smart contract, for each blockchain, an event called pairedEvent to the push-mode multi-factor authentication server; and notifying, by the push-mode multi-factor authentication server, the completion of the pairing process to the end-user.

In some embodiments, the retrieving step further comprises storing the cSCAddr in the at least one multi-factor provider smart contract.

In some embodiments, the accountID comprises a hash value of the account of the end-user computed using the MD5 or SHA-2 hash algorithm, among others.

In some embodiments, the clientAddr comprises a hash value.

In some embodiments, the end-user further comprises configuring a smart contract function address in the form of a tuple composed by a smart contract address termed cSCAddr and a function address. The multi-factor provider smart contract besides checking the status of the established multi-factor approval status further checks if the clientAddr is subjected to a conditionalMFAMap, and performs a call to a function indicated by conditionalMFAMap[clientAddr]) and returns the result if a result of said checking is positive (i.e. a condition is configured).

In some embodiments, the blockchain services include web3 services.

Therefore, present invention provides an on-chain push-mode multi-factor authentication solution where status of the multi-factor authentication (MFA) is stored directly in the blockchain. It has following advantages:

It avoids off-chain interaction for MFA.

It speeds up MFA interaction because all required data is on the blockchain.

It removes the gas payment to off-chain oracle networks, so reduces the cost of adopting MFA in web3.

It protects user-related information by storing hashed information.

It provides a flexible way to extend conditions required for MFA.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Present invention provides a method and system for on-chain push-mode multi-factor authentication (MFA) of users for blockchain services, in particular for Web3 services. In some particular embodiments, MFA refers to 2FA.

Particularly, the invention comprises the following entities/elements:

Blockchain: is a shared, immutable ledger that holds data or state.

Multi-Factor Authentication (MFA) provider smart contract: is the smart contract in the blockchain that provides all interactions required for MFA, such as for 2FA. There are as many replicas of this smart contract as the number of blockchains the MFA service is to be provided.

MFA server or provider backend: is the server/backend that implements all interactions with end-users for push-mode MFA. It is also responsible to propagate the MFA status to web3 blockchain.

Pairing DAPP: is a distributed web application where users can associate an MFA account with a public key (clientAddr).

Wallet: is a web3 account management application. It generates correct signature to web3 operations.

MFA SDK: is a piece of software that can be integrated in any smart contract that wants to interact with the MFA provider.

Client smart contract: is a smart contract that wants to use MFA from end-user.

Figure 1:
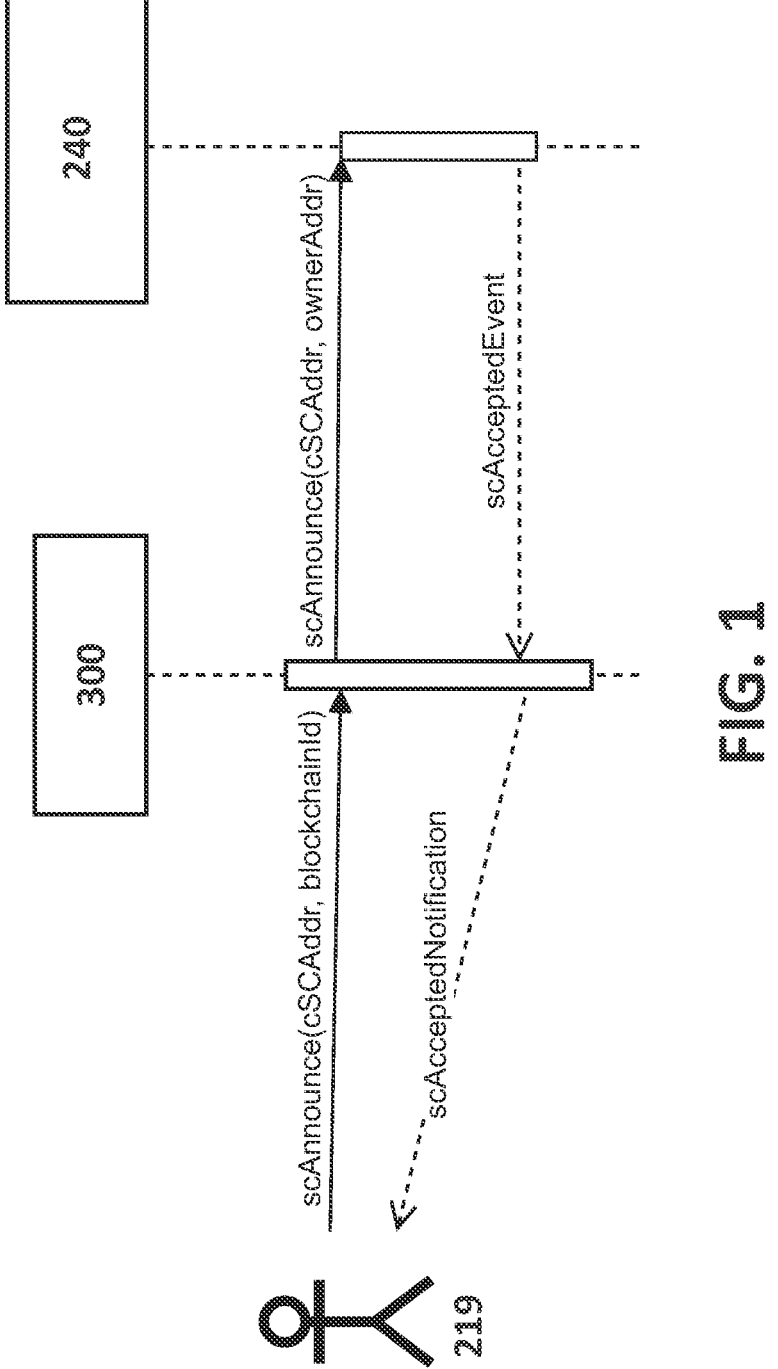
FIG. 1 is a diagram illustrating the client smart contract announcement process, according to an embodiment of the present invention.

FIG. 1 illustrates an embodiment of a client smart contract 220 announcement process. A client smart contract 220 can retrieve the user's MFA status from the proposed system by interacting with an MFA provider smart contract 240. Developer 219 of such client smart contract 220 needs first to announce the smart contract address (cSCAddr) to an MFA server 300 (or MFA provider backend).

The developer 219 needs to provide the address as well as a blockchain identification (blockchainId) to the MFA server 300, by calling scAnnounce API. The MFA server 300 calls the scAnnounce function in the MFA provider smart contract 240. The announcement process will be repeated as many times as the number of blockchains on which the MFA Provider 240 operates. When all blockchains are updated, the server 300 sends a notification to the developer 219 (scAcceptedNotification).

The cSCAddr is stored in the MFA provider smart contract 240 and it is used to accept MFA requests. Only smart contracts with the address listed in MFA provider smart contract 240 can retrieve the multi-factor approval status.

Figure 2:
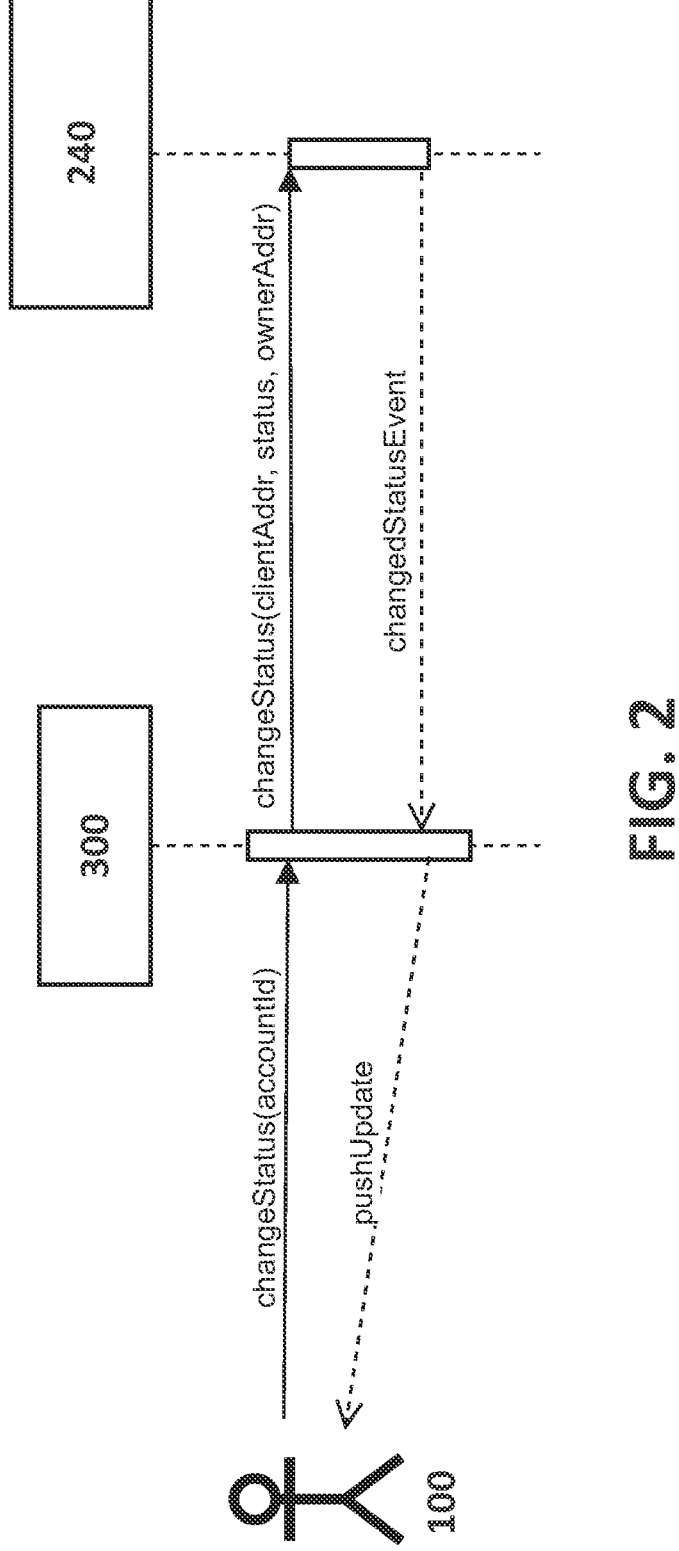
FIG. 2 is a diagram illustrating the multi-factor authentication status update process, according to an embodiment of the present invention.

With reference now to FIG. 2, therein an embodiment of how the MFA status is informed/updated is shown. The end-user 100 can change the MFA approval status by interacting with a mobile application. The application calls changeStatus API to change the approval status. If user's account is paired with a web3 clientAddr, the MFA server

300 calls changeStatus function from the MFA provider smart contract 240 with clientAddr and ownerAddr as input parameters. The MFA server 300 needs to call the MFA provider smart contract 240 in all blockchains that provides the MFA service.

Blockchain operations are asynchronous, and it may take long time to execute. A pushUpdate notification is delivered to the end-user 100 when approval status is notified/updated in all blockchains.

Figure 3:
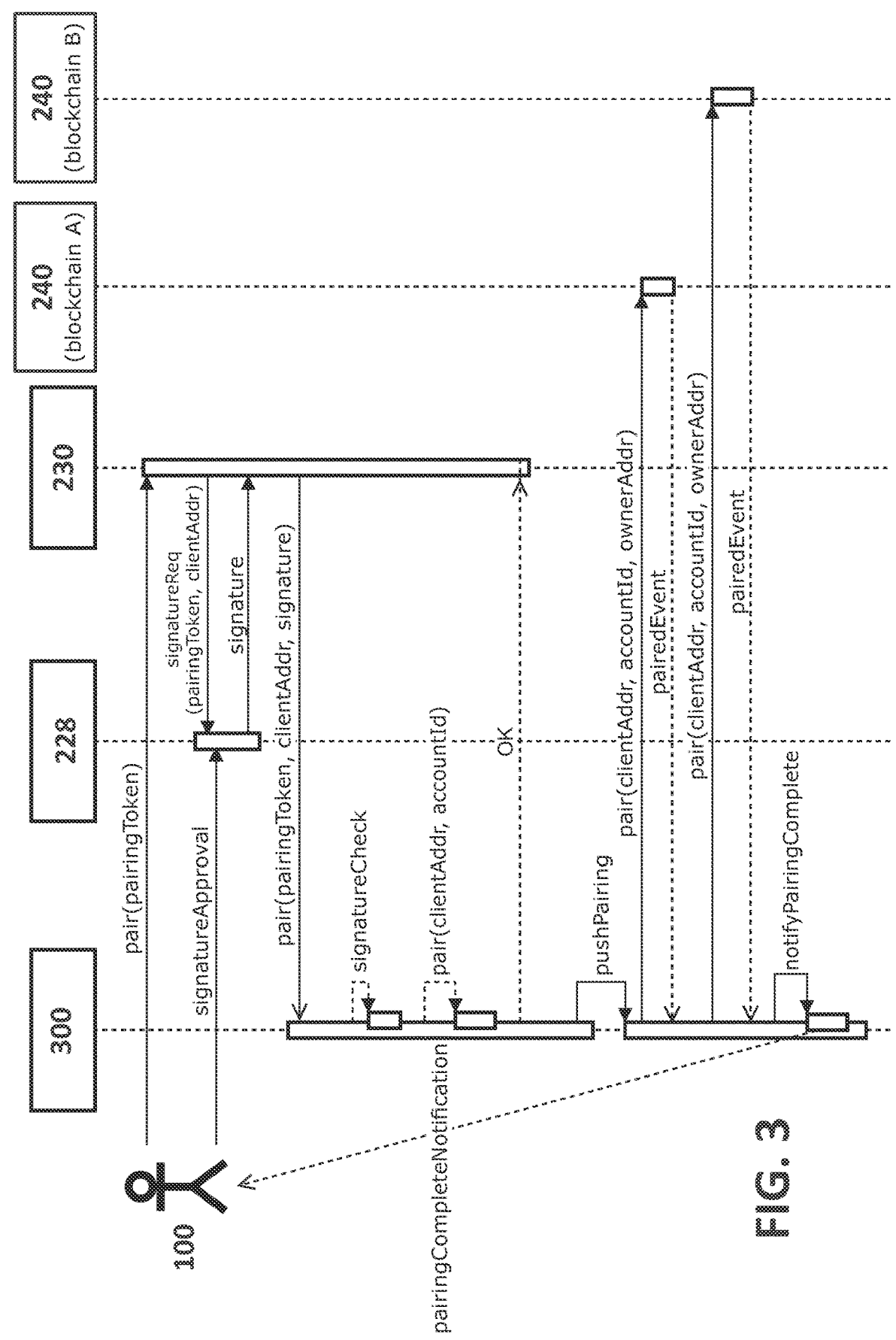
FIG. 3 is a diagram illustrating the pairing process, according to an embodiment of the present invention.

With reference to FIG. 3, therein an embodiment of the pairing process is shown. It is assumed that the end-user 100 already has an account in the MFA server 300. In an embodiment, the method implements the API defined by Telefonica's Latch solution (https://latch.elevenpaths.com/www/index.html). Nevertheless, other push-mode MFA services could be equally used.

The goal of the pairing process is to associate the user account in the MFA server 300 (accountId) with the user's wallet address (clientAddr). The process starts when the end-user 300 access a pairing DAPP (distributed application) 230 and contains following steps. First, the end-user 100 accesses the MFA software application and requests a pairing Token to pair a new multi-factor service (token). The same pairing Token will be temporally stored in the MFA server 300. Then, the end-user 100 accesses the Pairing DAPP 230 and connects with Wallet Management Software 228 (such as the Metamask). Once connected, the clienteAddr (the public key of the user) is revealed to the pairing DAPP 230. Next, the end-user 100 introduces the pairing Token to an input field in the pairing DAPP 230 and activates the pairing process. The pairing DAPP 230 activates a Signature Request to the wallet management software 228. The end-user 100 is asked to approve the signature (calling signatureApproval) and a signature is generated associated with pairing Token and clientAddr.

The pairingToken, clientAddr and signature is then delivered to MFA server 300 in the pair(pairing Token, clientAddr, signature) call. The MFA server 300 checks the signature by calling signatureCheck. If everything is correct, it creates required data structure to pair user's accountId and user's clientAddr. The MFA server 300 also pushes the pairing information to the MFA provider smart contract 240. For each blockchain (A, B), MFA server 300 calls pair (clientAddr, accountId) function indicating the owner address. The owner address, together with the correspondent signature, is used to authorize the call to pair function. The pair function creates the data structure to map clientAddr and accountId. Furthermore, it emits an event called pairedEvent. Once pairing information is pushed to all blockchains (A, B), the MFA server 300 notifies the end-user 100 by sending a pairingCompleteNotification.

Figure 4:
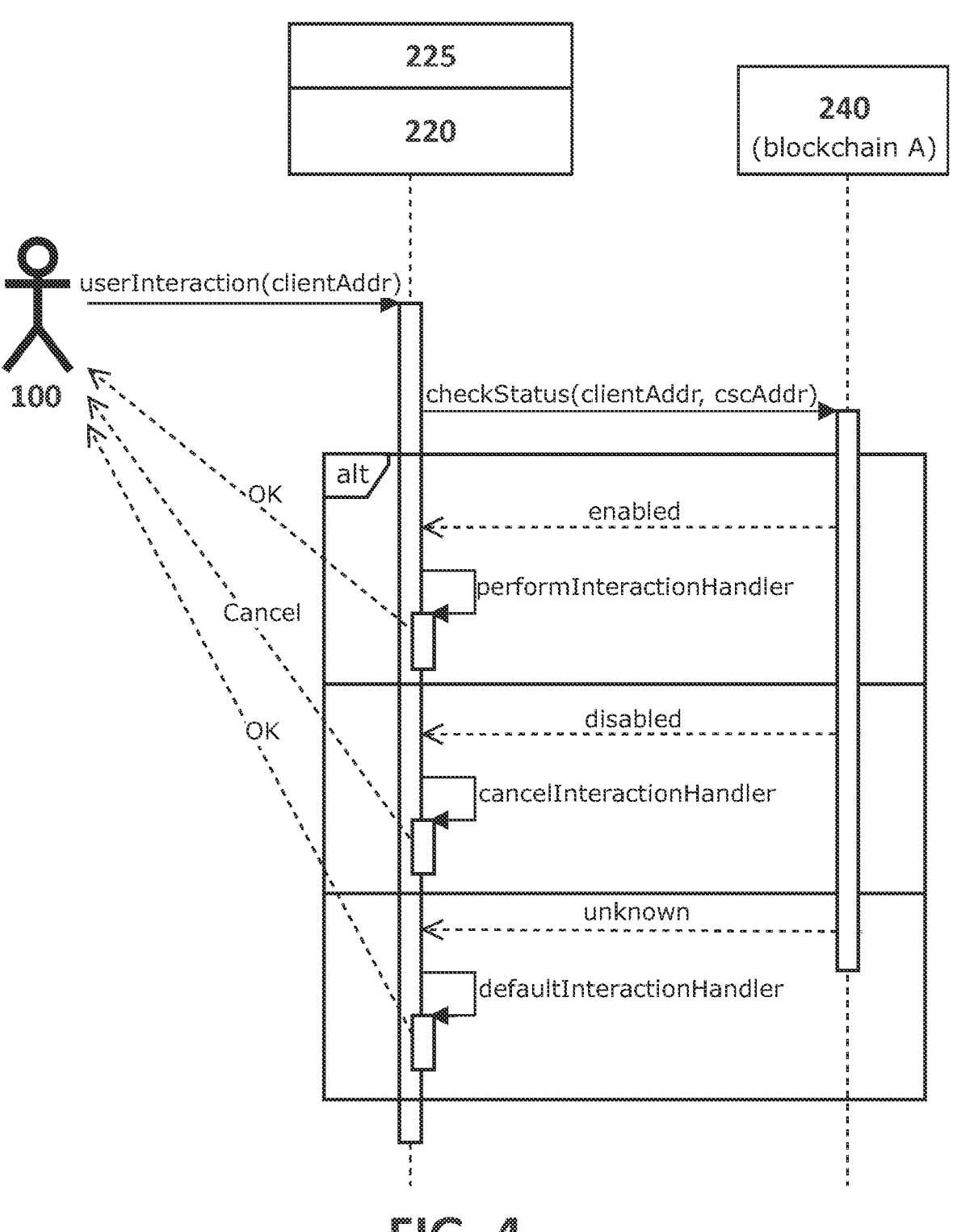
FIG. 4 is a diagram illustrating the multi-factor authentication request process, according to an embodiment of the present invention.

FIG. 4 illustrates an embodiment of the MFA request process. The client smart contract 220 needs to integrate with MFA SDK 225 to perform MFA. The end-user 100 interacts with the client smart contract 220 by calling different functions. Given a userInteraction, following process is stablished to perform MFA. First, given the client address (clientAddr), the client smart contract 220 calls checkStatus function from the SDK 225. The checkStatus checks the client smart contract address (cscAddr) to make sure that the client smart contract 220 is correctly announced. The checkStatus function can return up to three alterative values. If the MFA approval status is enabled (on), the client smart contract 220 can proceed with the operation by calling the performInteractionHandler. Alternatively, if the approval status is disabled (off), the interaction is canceled. It could be possible that client smart contract 220 is not announced or the clientAddr is not paired with any user's account. In both case, unknown will be returned. The client smart contract 220 then executes the defaultInteractionHandler As said before, the MFA provider smart contract 240 can operate in different blockchains. Thus a smart contract is deployed in each blockchain. The MFA provider smart contract 240 can provide the following state variables:

cscAddrList[ ]: Client Smart Contract Address list. It is the list that contains addresses of all clients smart contracts that are announced to the MFA service.

clientAddrAccountMap{ }: The mapping between end-user clientAddr and accountId. It is implemented as a map structure where key is the clientAddr and value is accountId.

statusMFA{ }: It is the MFA approval status. It is implemented as a map structure where key is the clientAddr and value is Boolean.

Figure 5:
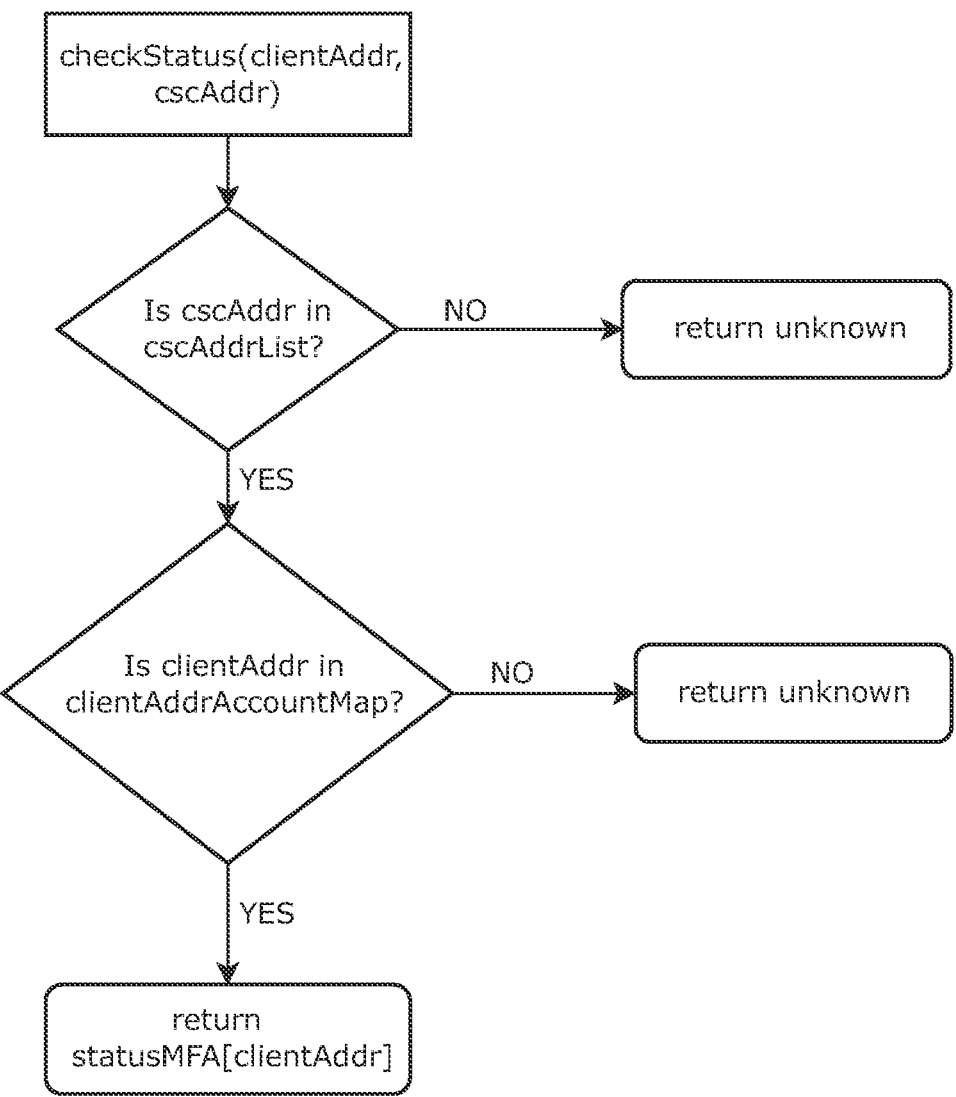
FIG. 5 is a diagram illustrating how the multi-factor approval status for a given end-user and smart contract is checked, according to an embodiment of the present invention.
Figure 6:
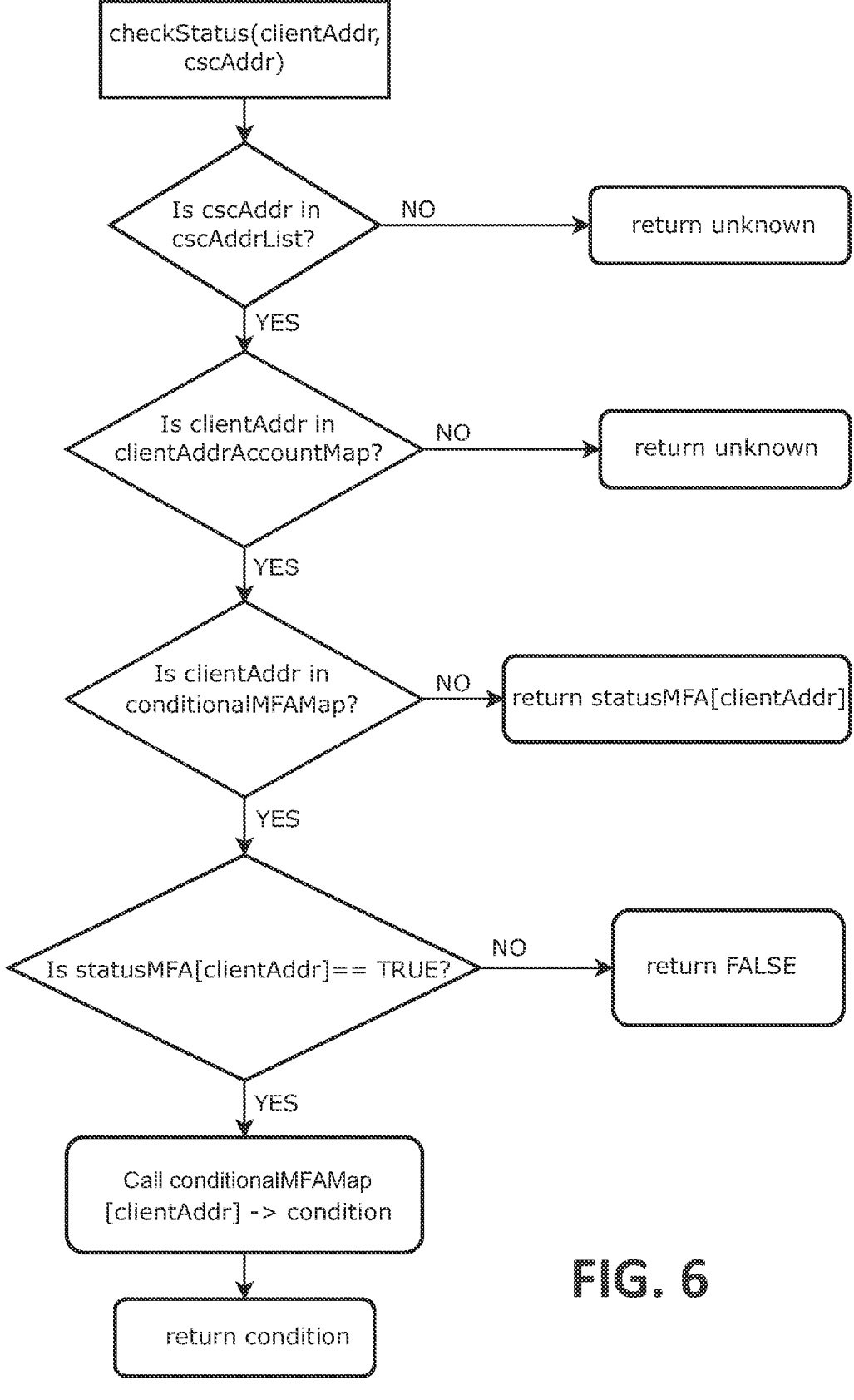
FIG. 6 is a diagram illustrating how the multi-factor approval status for a given end-user and smart contract is checked, according to another embodiment of the present invention.

Finally, it contains four functions:

scAnnounce(cscAddr): this function adds cscAddr into the cscAddrList.

pair(clientAddr, accountId): this function is called when end-user 100 wants to pair the clientAddr to the MFA user's account (accountId).

changeStatus(clientAddr, status): this function changes the value in the statusMFA (with key clientAddr) to the new approval status.

checkStatus(clientAddr, cscAddr): this function checks the status of MFA of a given end-user and smart contract. It first checks if the cscAddr is in the cscAddrList, then checks if the clientAddr is in clientAddrAccountMap. Finally, it returns the value in the statusMFA (with key clientAddr). See FIG. 5 for an embodiment.

In some embodiments, additional security measures can be further provided/used. For instance, although the accountId does not reveal any personal information about the end-user 100, present invention can further protect him/her by storing the hash of the accountId, instead of the original value. To do so, the MFA server 300 computes the hash (accountId) before calling pair function. Different hash function, such as MD5 or SHA-2, could be used in the implementation. By storing hash result, accountId is never revealed to the blockchain.

Moreover, the map statusMFA is indexed by clientAddr, the public key of the end-user in web3. Present invention can change the key to hash(clientAddr), so provide additional protection to the web3 identity of the end-user 100.

Yet, in some embodiments, a conditional MFA approval status to extend the MFA approval status is contemplated. This conditional MFA approval status allows the end-user 100 to configure a smart contract function address, in form of a tuple composed by the smart contract address and the function address. Following changes are required to implement conditional MFA status. In the MFA provider smart contract 240, a new map (conditionalMFAMap) is introduced. A new function is introduced in the MFA provider smart contract 240: conditionalFunc(clientAddr, funcAddr), where clientAddr is the client public key and funcAddr is the address of a smart contract function. The function pointed by funcAddr should return a Boolean. The logic of checkStatus adds an extra step that checks if the clientAddr is in conditionalMFAMap. If a condition is configured, it performs a call to the function (indicated by conditionalMFAMap[clientAddr]) and returns the result.

Those having ordinary skill in the art will recognize that numerous modifications can be made to the specific implementations described above. The implementations should not be limited to the particular limitations described. Other implementations may be possible.

The scope of the invention is defined in the claims that follow.

The invention claimed is:

1. A method for multi-factor authentication for blockchain services, the method comprising:

holding, by a push-mode multi-factor authentication server, an account of an end-user, the account being identifiable via an accountID;

associating the accountID with an end-user's wallet address termed clientAddr by means of executing a pairing process;

establishing, by the end-user, using a software application installed on a computing device, a multi-factor approval status for a multi-factor service in the push-mode multi-factor authentication server;

in response to said established multi-factor approval status, calling, by the push-mode multi-factor authentication server, a changeStatus function of a multi-factor provider smart contract operating in at least one blockchain, the changeStatus function including the established multi-factor approval status, the clientAddr, and a certificate signed by the owner of the multi-factor provider smart contract, termed ownerAddr;

modifying, by the multi-factor provider smart contract, the established multi-factor approval status in the at least one blockchain;

delivering, by the multi-factor provider smart contract, a notification to the end-user via the push-mode multi-factor authentication server when the established multi-factor approval status is modified in the at least one blockchain; and retrieving, by a developer of a smart contract of the end-user, the established multi-factor approval status from the multi-factor provider smart contract by means of providing a smart contract address termed cSCAddr and a blockchain identification termed blockchainID to the push-mode multi-factor authentication server.

2. The method of claim 1, wherein the multi-factor provider smart contract operates in several blockchains, and wherein the push-mode multi-factor authentication server comprises calling the multi-factor provider smart contract in all of said several blockchains.

3. The method of claim 1, wherein the pairing process comprises:

requesting, by the end-user, a pairing Token to pair the multi-factor service;

providing the clientAddr and the pairingToken to a distributed web application;

providing, by the distributed web application, a signature request to a wallet application;

generating, by the wallet application, a signature associated with the pairingToken and the clientAddr as a result of the end-user having approved the signature, the signature being generated by a private key associated with the clientAddr;

sending, by the distributed web application, the pairingToken, the clientAddr, and the generated signature to the push-mode multi-factor authentication server;

creating, by the push-mode multi-factor authentication server, a pairing structure that pairs the accountID and the clientAddr after the push-mode multi-factor authentication server having checked the legitimacy of the generated signature and validity of the pairingToken;

providing, by the push-mode multi-factor authentication server, for each blockchain, the pairing structure together with the ownerAddr to the multi-factor provider smart contract;

authorizing, by the multi-factor provider smart contract, a call to a pair function that creates the data structure to associate the accountID with the clienAddr by means of using a signature generated by a private key associated with the ownerAddr;

providing, by the multi-factor provider smart contract, for each blockchain, an event called pairedEvent to the push-mode multi-factor authentication server; and notifying, by the push-mode multi-factor authentication server, the completion of the pairing process to the end-user.

4. The method of claim 1, wherein the retrieving step further comprises storing the cSCAddr in the at least one multi-factor provider smart contract.

5. The method of claim 1, wherein the accountID comprises a hash value of the account of the end-user computed using the MD5 or SHA-2 hash algorithm.

6. The method of claim 1, wherein the clientAddr comprises a hash value.

7. The method of claim 1, wherein the end-user further comprises configuring a smart contract function address in the form of a tuple composed by a smart contract address termed cSCAddr and a function address, and wherein the multi-factor provider smart contract besides checking the status of the established multi-factor approval status further checks if the clientAddr is subjected to a conditionalMFAMap, and performs a call to a function indicated by conditionalMFAMap [clientAddr]) and returns the result if a result of said checking is positive.

8. The method of claim 1, wherein the blockchain services include web3 services.

9. A system for multi-factor authentication for blockchain services, the system comprising:

at least one blockchain;

a multi-factor provider smart contract implemented or operating in the at least one blockchain;

a wallet application;

a distributed web application; and a push-mode multi-factor authentication server, implemented at least in part in hardware, configured to hold an account of an end-user, the account being identifiable via an accountID, and to store a multi-factor approval status for a multi-factor service established by the end-user, wherein the system is configured to implement the method of claim 1.

10. The system of claim 9, wherein the blockchain services include web3 services.

\* \* \* \* \*